United States Patent
Gan et al.

(10) Patent No.: US 9,418,174 B1
(45) Date of Patent: Aug. 16, 2016

(54) RELATIONSHIP IDENTIFICATION SYSTEM

(75) Inventors: Zhen-Qi Gan, Carrollton, TX (US);
Brian C. Urch, Hampstead, MD (US);
Todd R. Calvert, Baltimore, MD (US)

(73) Assignee: Raytheon Company, Waltham, MA (US)

( * ) Notice: Subject to any disclaimer, the term of this patent is extended or adjusted under 35 U.S.C. 154(b) by 1375 days.

(21) Appl. No.: 12/343,153

(22) Filed: Dec. 23, 2008

Related U.S. Application Data

(60) Provisional application No. 61/017,458, filed on Dec. 28, 2007.

(51) Int. Cl.
*G06F 17/30* (2006.01)
*G06N 5/02* (2006.01)

(52) U.S. Cl.
CPC .... *G06F 17/30914* (2013.01); *G06F 17/30705* (2013.01); *G06F 17/30707* (2013.01); *G06N 5/02* (2013.01)

(58) Field of Classification Search
CPC .................. G06F 17/30705; G06F 17/30707; G06F 17/30914; G06N 5/02
See application file for complete search history.

(56) References Cited

U.S. PATENT DOCUMENTS

| | | | |
|---|---|---|---|
| 6,108,004 A | 8/2000 | Medl | 715/804 |
| 6,311,179 B1 | 10/2001 | Agarwal et al. | 707/3 |
| 6,769,010 B1 | 7/2004 | Knapp et al. | 709/203 |
| 7,315,861 B2 | 1/2008 | Seibel et al. | 707/10 |
| 7,330,850 B1 | 2/2008 | Seibel et al. | 707/4 |
| 7,493,315 B2 | 2/2009 | Holbrook | 707/3 |
| 2004/0078214 A1 | 4/2004 | Speiser et al. | 705/1 |
| 2007/0118542 A1* | 5/2007 | Sweeney | 707/100 |

* cited by examiner

*Primary Examiner* — Ann J Lo
(74) *Attorney, Agent, or Firm* — Daly, Crowley, Medford & Durkee, LLP

(57) ABSTRACT

According to one embodiment, a computer-executed system includes a relationship identification tool coupled to one or more data storage systems and a user interface. Each data storage system has multiple data entities that are organized in at least one folder according to a particular taxonomy scheme. The relationship identification tool is operable to receive data entities from the data storage systems, and determine relationship intimacy values for each data entity relative to the other plurality of data entities according to its taxonomy scheme. These relationship intimacy values are then displayed on the user interface.

19 Claims, 2 Drawing Sheets

RELATIONSHIP IDENTIFICATION SYSTEM

RELATED APPLICATIONS

This application claims priority to U.S. Provisional Patent Application Ser. No. 61/017,458, entitled "RELATIONSHIP WEIGHTING PROCESS," which was filed on Dec. 28, 2007.

TECHNICAL FIELD OF THE DISCLOSURE

This disclosure generally relates to information retrieval systems, and more particularly, to a relationship identification system and a method of operating the same.

BACKGROUND OF THE DISCLOSURE

Computing systems use data storage devices for storing information. This information may be stored as individual data elements commonly referred to as data entities. The data entities may include any type of information, such as alpha-numeric information, graphical information, and/or photographic information. Data entities may be references, such as tags, metadata, or uniform resource locater (URL) links that uniquely identify another data element stored at another location. These data entities may be organized in one or more folders according to a particular relationship to one another. Folders provide an approach for classifying data entities according to their similarities, or their various objectives and/or purposes.

SUMMARY OF THE DISCLOSURE

According to one embodiment, a computer-executed system includes a relationship identification tool coupled to one or more data storage systems and a user interface. Each data storage system has multiple data entities that are organized in at least one folder according to a particular taxonomy scheme. The relationship identification tool is operable to receive data entities from the data storage systems and determine relationship intimacy values for each data entity relative to the other plurality of data entities according to its taxonomy scheme. These relationship intimacy values are then displayed on the user interface.

Some embodiments of the disclosure may provide numerous technical advantages. In one embodiment, for example, the relationship identification system discovers relationships among data entities organized in multiple folders according to one or more human generated taxonomy schemes. In many cases, the organization of data entities in this manner may enhance the efficiency in which these data entities are used or accessed. Multiple organizations may organize large quantities of data entities in folders using differing taxonomy schemes that may be suitable for their own purposes and/or objectives. The relationship identification system according to the present disclosure leverages the existing taxonomy structure used by various organizations to identify relationships of data entities to one another and thus identify additional information that may be available from known data entities.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

As previously described, data storage systems store information in the form of data entities that are often organized in folders for ease of access and/or management of large quantities. In many cases, data entities may be organized in folders according to a particular taxonomy scheme that classifies data entities according to a particular purpose, objective, and/or similarity. These folders are often organized in a hierarchal structure to form a subset/superset classification structure for the stored data entities.

Classification of data entities in folders is usually provided by a human cognitive thought process that seeks to determine a classification structure that is well suited for the data entities' use. Because the goals of various organizations or individuals that manage data storage systems may differ significantly from one another, the taxonomy scheme used to organize various types of data entities in these data storage systems may differ as well. These various taxonomy schemes, however, may possess useful information that has not been recognized by known data mining systems.

Figure 1:
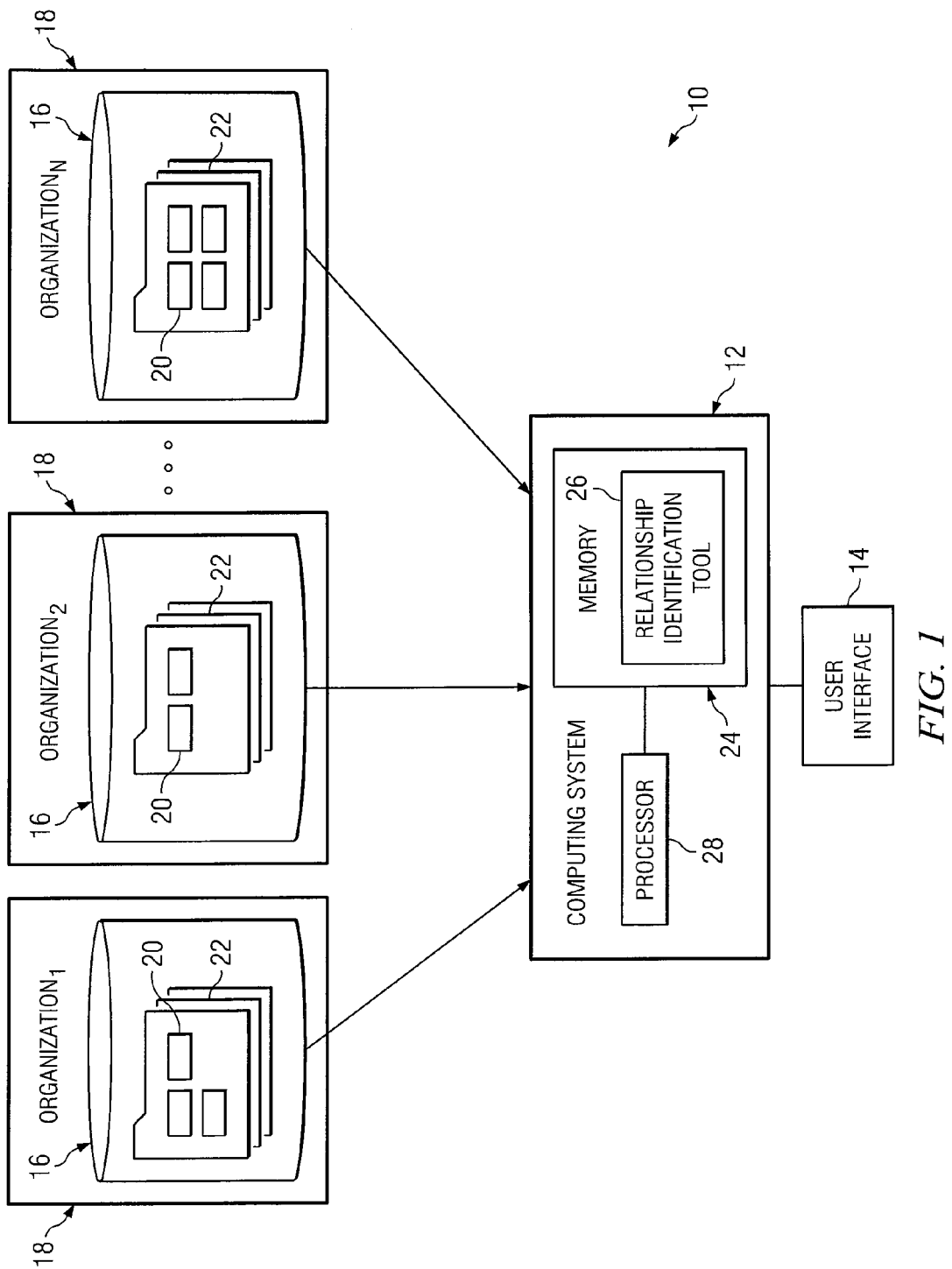
FIG. 1 is a block diagram showing one embodiment of a relationship identification system according to the teachings of the present disclosure.

FIG. 1 is a diagram showing one embodiment of a relationship identification system 10 according to the teachings of the present disclosure. Relationship identification system 10 includes a computing system 12 coupled to a user interface 14 and one or more data storage systems 16 managed by multiple organizations 18. Data storage systems 16 each store multiple data entities 20 that may be each organized in one or more folders 22. Computing system 12 includes a system memory 24 for storing a relationship identification tool 26 that is executed by a processor 28. As such, system memory 24 is an example of a non-transitory computer-readable storage medium. As will be described in detail below, relationship identification tool 26 determines relationship intimacy levels for data entities 20 with respect to one another and displays these relationship intimacy levels on user interface 14 according to a taxonomy scheme in which data entities 20 are classified in folders 22.

Organizations 18 that manage data storage systems 16 may include corporations, businesses, or any other type of entity that manages data storage systems 16 for storage and organization of data entities 20. Although the present embodiment is directed to data storage systems 16 managed by organizations 18, such as enterprises having multiple users, the teachings of the present disclosure may also be directed to managing entities of data storage systems 16, such as individuals who organize data entities 20 in folders 22 for personal or business use.

Data entities 20 stored in data storage systems 16 may include any suitable form of information, such as textual information, audio/video information, graphical information, and the like. For example, data entities 20 may include files that are organized in a suitable file system. In one embodiment, data entities 20 may be references, such as filenames, metadata, or uniform resource locater (URL) links to information stored in other data entities 20.

Data storage system 16 may be any suitable storage system for storing data entities 20. For example, data storage system 16 may include a mass storage disk or a tape drive that stores digital information. As another example, data storage system 16 may include mass storage disks of a number of computing systems that are coupled together through a network, such as the Internet. Data storage systems of this type may be commonly referred to as storage clusters or federated storage systems.

Each data storage system 16 has one or more folders 22 for storing data entities 20. Folders 22 may be any suitable structure for organizing multiple data entities 20. For example, a folder 22 may be a catalog that houses a number of metadata tags that reference other data entities 20. As another example, a folder 22 may include a sub-directory of a file system administered by its associated computing system. As another example, a folder 22 may be a bookmarks folder similar to those used by known web browsers. The bookmarks folder houses several uniform resource locater links that reference data entities 20 stored in other locations. In one embodiment, folders 22 are organized in a hierarchal format such that some folders 22 may themselves be organized in one or more other folders 22.

Relationship identification system 10 may be implemented on any suitable computing system 12 that may be, for example, a network coupled computing system or a stand-alone computing system. The stand-alone computing system may be any suitable computing system, such as a personal computer, laptop computer, or mainframe computer capable of executing instructions necessary to implement relationship identification tool 26 according to the teachings of the present disclosure. The network computing system may be a number of computers coupled together via a network, such as a local area network (LAN), a metropolitan area network (MAN), or a wide area network (WAN).

User interface 14 includes a display, such as a cathode ray tube (CRT) or a liquid crystal display (LCD) for displaying relationship intimacy levels generated by relationship identification tool 26. User interface 14 may also include a keyboard, a mouse, a console button, or other similar type of user input device for inputting user information to relationship identification system 10.

Relationship identification tool 26 generates relationship intimacy values for each data entity's 20 relative intimacy level relative to other data entities 20. The generated intimacy values may be useful for identifying other data entities 20 that may have similarities to a particular data entity 20. For example, a geographical-based folder 22 may be established to group multiple data entities 20 according to a particular geographical region. A weather-based folder 22 may be established to group multiple data entities 20 according to weather related information. In some instances, the weather-based folder 22 having data entities 20 associated with weather related information may also include data entities 20 associated with a particular geographical region. Relationship identification system 10 generates relationship intimacy values for data entities 20 grouped in the geographical-based folder 22 and weather-based folder 22 to enhance searches for pertinent information.

Relationship identification tool 26 generates relationship intimacy values of data entities 20 relative to other data entities 20 according to their classification in the various folders 22. Entities organized in the same folder 22 may be asserted to be related. Thus, relationship identification tool 26 may assign relationship intimacy values according to data entities 20 that are organized in the same folder 22. A data entity 20 may also be organized in multiple folders 22 that each includes differing data entities 20. Although not in the same folder 22, data entities 20 organized with other data entities 20 from a differing folder 22 may have a relationship that is inferred. Thus, relationship identification tool 26 may assign relationship intimacy values according to an inferred relationship in which data entities 20 that are organized differing folders 22 share a common data entity 20. In this manner, relationship identification tool 26 may utilize the taxonomy scheme used to classify data entities 20 in the various folders 22 to determine asserted and/or inferred relationships among multiple data entities 20 organized in differing folders 22.

According to one embodiment, relationship identification tool 26 generates relationship intimacy values by assigning intimacy values for differing types of relationships. For example, relationship identification tool 26 assigns a particular intimacy value for data entities 20 relationship to others having an asserted relationship and assigns a differing intimacy value for relationships having an inferred relationship. In one embodiment, these intimacy values may be combined in differing fashions to generate relationship intimacy values for each data entity 20 relative to other data entities 20.

Relationship identification system 10 may generate relationship intimacy values for each data entity 20 relative to other data entities 20 organized in the same folder 22 as well as those organized in differing folders 22. Relationship intimacy values may be generated in any suitable manner. In one embodiment, a relationship intimacy value may be a numeric value comprising a summation of several component intimacy values. Given one particular data entity 20, relationship identification system 10 scans through data storage system 12 for other data entities 20 meeting particular criteria relative to the particular data entity 20 and assigns one or more component intimacy values to that data entity 20.

Relationship identification tool 26 may generate relationship intimacy values in response to a request from user interface 14. The request from user interface may include any quantity of data entities 20 from which relationship intimacy values are generated. For example, user interface 14 may issue a request for relationship identification tool 26 to generate relationship intimacy values for one particular data entity 20 while another request may be issued for generating relationship intimacy values for all data entities 20 organized in one or more folders 22.

Figure 2:
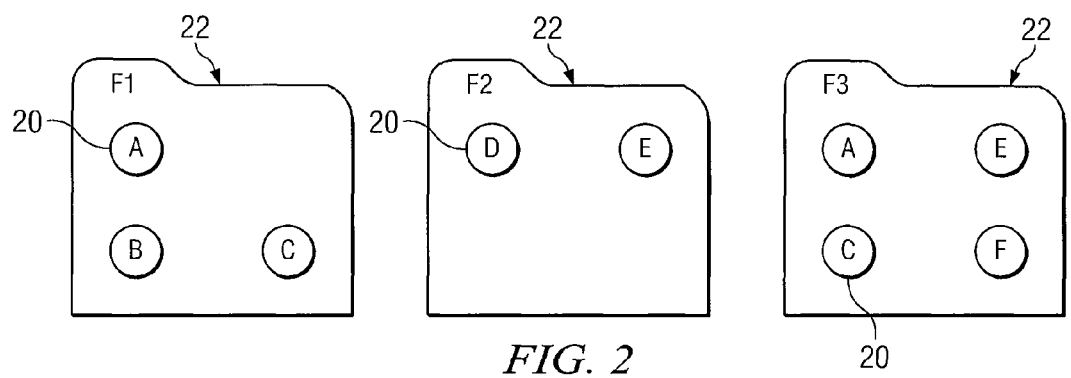
FIG. 2 is an illustration showing several examples of folders having data entities that are stored in the data storage systems of FIG. 1.

FIG. 2 is an illustration showing several examples of folders having data entities that are stored in the data storage systems of FIG. 1. Each folder 22 has several data entities 20. Folder 22*a* has "A", "B", and "C" data entities 20, folder 22*b* has "D" and "E" data entities 20, and folder 22*c* has "A", "C", "E", and "F" data entities 20. In these particular folders 22, some data entities 20, such as the "A", "C", and "E" data entities 20 are stored in multiple folders 22. "A", "B", and "C" data entities 20 are organized in the same folder and thus have an asserted relationship with one another. "A" data entity 20 is organized in the "F1" and "F3" folder 22. Thus, "C", "E", and "F" data entities 20 may also have an inferred relationship with "A" data entity 20.

Figure 3:
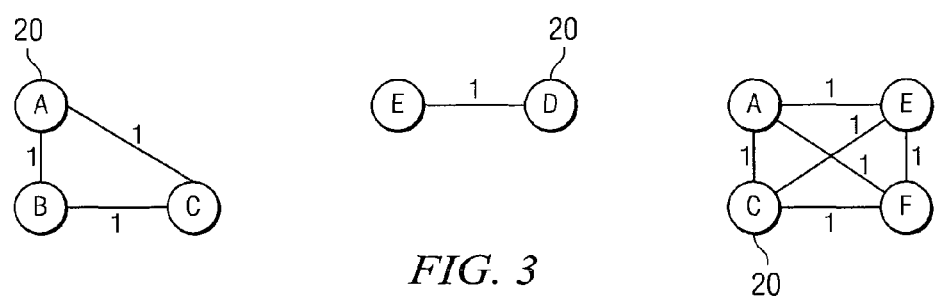
FIG. 3 are node-link diagrams showing one embodiment of component intimacy values that may be generated for data entities grouped in the same folder.

FIG. 3 is a node-link diagram showing one embodiment of intimacy values that may be generated for data entities 20 in the same folders 22. As shown, a component intimacy value of "1" may be generated for each of "A", "B", and "C" data entities 20 relative to one another. A component intimacy value of "1" may be generated for "E" and "D" data entities 20 relative to one another. A component intimacy value of "1" may be generated for each of "A", "E", "C" and "F" data entities 20 relative to one another. In each of these examples, component intimacy values of "1" have been generated between data entities 20 having an asserted relationship.

Referring again to FIG. 2, relationship identification system 10 may generate relationship intimacy values for data entities 20 having an inferred relationship. That is, relationship identification system 10 may generate relationship intimacy values for data entities 20 that are in a different folder 22 from one another in which the differing folders 22 share a common data entity 20. For example, "A" data entity 20 is in folder 22c and "D" data entity 20 is in folder 22b. Because folders 22b and 18c share "E" data entity 20, relationship identification system 10 may generate a component intimacy value for "E" data entity 20 relative to "A" data entity 20. In one embodiment, intimacy values generated for data entities 20 having an inferred relationship may be less than intimacy values generated for those having an asserted relationship.

In one embodiment, a component intimacy value may be generated for a data entities 20 relative to another data entity 20 in which multiple (N−1) folders 22 share multiple data entities 20. That is, multiple (N−1) folders 22 may form a chain in which each adjacent folder 22 is associated with a common data entity 20. In another embodiment, component intimacy values generated for data entities 20 in a chain are inversely proportional to the length of the folder 22 chain.

The following list includes relationship intimacy values that may be generated by relationship identification system 10 for data entities 20 shown in FIG. 2.

s[ArB]=s[A-B]+s[A-C-B]=1.0+0.5=1.5
s[ArC]=s[A-C]+s[A-B-C]+s[A-E-C]+s[A-F-C]=2.0+0.5+0.5+0.5=3.5
s[ArD]=s[A-E-D]=0.5
s[ArE]=s[A-E]+s[A-C-E]+s[A-F-E]=1.0+0.5+0.5=2.0
s[ArF]=s[A-F]+s[A-E-F]+[A-C-F]=1.0+0.5+0.5=2.0
s[BrC]=s[B-C]+s[B-A-C]=1.0+0.5=1.5
s[BrD]=s[B-A-E-D]=0.3
s[BrE]=s[B-A-E]+s[B-C-E]=0.5+0.5=1.0
s[BrF]=s[B-C-F]+s[B-A-E-F]=0.5+0.3=0.8
s[CrD]=s[C-D-E]=0.5
s[CrE]=s[C-E]+s[C-A-E]+s[C-F-E]=1.0+0.5+0.5=2.0
s[CrF]=s[C-F]+s[C-E-F]=1.0+0.5=1.5
s[DrE]=s[D-E]=1.0
s[DrF]=s[D-E-F]=0.5
s[ErF]=s[E-F]+s[E-C-F]=1.0+0.5=1.5

Increasing values of relationship intimacy values may indicate a corresponding increasing level of relationship intimacy between data entities 20. Thus, data entities 20 having relatively high relationship weighting values relative to one another may be assumed to be related.

The previously described relationship identification technique describes one particular embodiment of identifying relationships according to the taxonomy scheme of data entities 20 organized in multiple folders 22. Other embodiments of relationship identification techniques may be implemented. For example, relationship identification tool 26 may use a "nearest neighbor" relationship identification technique in which component intimacy values are assigned according to the quantity of folders 22 associated between data entities 20 with an inferred relationship. That is, the relationship intimacy value assigned to the relationship between two data entities 20 may be a product of the quantity of folders 22 forming a chain in which each adjacent folder is associated with a common data entity 20. In another embodiment, relationship identification tool 26 may use a "fastest route" relationship identification technique in which in which component intimacy values are assigned according to the quantity of common data entities 20 that form inferred relationships between two data entities 20. Thus, data entities 20 having many inferred relationships may be assumed to have a stronger relationship than those having relatively few inferred relationships using the fastest route relationship identification technique.

Once generated, the relationship intimacy values may be displayed on user interface 14 for visualization by the user. The relationship intimacy values may be displayed in any suitable form. In one embodiment, relationship identification tool 26 displays relationship intimacy values using a node-link diagram similar to the node-link diagram of FIG. 3. In one embodiment, the distance between data entities 20 may be proportional to their relationship intimacy level. That is, data entities 20 having a relatively strong relationship intimacy level may be displayed relatively closer together than other data entities 20 whose relationship intimacy level is not as strong. In other embodiments, relationship intimacy levels may be displayed in differing colors and/or thickness of lines to indicate relationship level of their associated data entities 20.

Modifications, additions, or omissions may be made to relationship identification system 10 without departing from the scope of the disclosure. The components of relationship identification system 10 may be integrated or separated. For example, one or more data storage systems 16 may form an integral part of computing system 12 or may be remotely coupled to computing system 12 using a suitable communication link, such as the Internet. Moreover, the operations of relationship identification system 10 may be performed by more, fewer, or other components. For example, computing system 12 may include other processing tools, such as database access tools, that facilitate retrieval and/or access of information associated with data entities 20 stored in data storage systems 16. Additionally, operations of relationship identification tool 26 may be performed using any suitable logic comprising software, hardware, and/or other logic.

Although the present disclosure has been described with several embodiments, a myriad of changes, variations, alterations, transformations, and modifications may be suggested to one skilled in the art, and it is intended that the present disclosure encompass such changes, variations, alterations, transformation, and modifications as they fall within the scope of the appended claims.

What is claimed is:

1. A system for identifying data entity relationships comprising:
    a user interface;
    one or more storage devices operable to store a plurality of data entities, each of the plurality of data entities organized in at least one of a plurality of folders according to a taxonomy scheme; and
    a relationship identification tool stored on a memory and executable by a computer processor, the relationship identification tool coupled to the user interface and the one or more storage devices, the relationship identification tool operable to:
    receive the plurality of data entities from the one or more storage devices;
    identify asserted relationships between each data entity of the plurality of data entities that is organized in a same folder of the plurality of folders;
    identify inferred relationships between at least two data entities of the plurality of data entities that are in different folders of the plurality of folders, wherein the different folders share a common data entity contained therein;
    determine a relationship intimacy value of a first data entity of the plurality of data entities relative to a second data entity of the plurality of data entities, wherein the relationship intimacy value between the first and second data entities is a function of the asserted and inferred relationships between the first and second data entities; and display one or more relationship intimacy values on the user interface.

2. The system of claim 1, wherein the asserted and inferred relationships are weighted, the asserted relationship being assigned a weighted value that is greater than the weighted value assigned to the inferred relationship, and wherein the weighted values are included in the determination of the relationship intimacy value.

3. The system of claim 1, wherein the relationship identification tool is operable to determine the relationship intimacy value of the first data entity according to a nearest neighbor technique.

4. The system of claim 1, wherein the relationship identification tool is operable to determine the relationship intimacy value of the first data entity according to a fastest route technique.

5. The system of claim 1, wherein the relationship identification tool is operable to display the relationship intimacy values as a node-link diagram on the user interface.

6. The system of claim 1, wherein the relationship identification tool is operable to display the relationship intimacy values that exceed a specified threshold.

7. The system of claim 1, wherein at least one of the plurality of data entities is selected from a group consisting of a tag, a uniform resource locater (URL) link, and a metadata instance.

8. A computerized method for identifying data entity relationships comprising:

receiving a plurality of data entities from one or more storage devices that store the plurality of data entities, each of the plurality of data entities organized in at least one of a plurality of folders according to a taxonomy scheme;

identifying, by a computer, asserted relationships between each data entity of the plurality of data entities that is organized in a same folder of the plurality of folders;

identifying, by the computer, inferred relationships between at least two data entities of the plurality of data entities that are in different folders of the plurality of folders, wherein the different folders share a common data entity contained therein;

determining, by the computer, a relationship intimacy value for a first data entity of the plurality of data entities relative to a second data entity of the plurality of data entities, wherein the relationship intimacy value between the first and second data entities is a function of all the asserted and inferred relationships between the first and second data entities; and displaying, by the computer, one or more relationship intimacy values on a user interface.

9. The computerized method of claim 8, wherein the asserted and inferred relationships are weighted, the asserted relationships having a weighted value that is greater than the weighted value of the inferred relationships, and wherein the weighted values are included in the determination of the relationship intimacy value.

10. The computerized method of claim 8, wherein determining the relationship intimacy value includes using a nearest neighbor technique.

11. The computerized method of claim 8, wherein determining the relationship intimacy value includes using a fastest route technique.

12. The computerized method of claim 8, wherein displaying the relationship intimacy values on the user interface comprises displaying a node-link diagram on the user interface.

13. The computerized method of claim 8, wherein displaying the relationship intimacy values on the user interface comprises displaying relationship intimacy values that exceed a specified threshold.

14. A non-transitory computer-readable storage medium having code embodied thereon that is operable, when executed by a processor, to perform at least the following:

receive a plurality of data entities from one or more storage devices that store the plurality of data entities, each of the plurality of data entities organized in at least one of a plurality of folders according to a taxonomy scheme;

identify asserted relationships between each data entity of the plurality of data entities that is organized in a same folder of the plurality of folders;

identify inferred relationships between at least two data entities of the plurality of data entities that are in different folders of the plurality of folders, wherein the different folders share a common data entity contained therein;

determine a relationship intimacy value for a first data entity of the plurality of data entities relative to a second data entity of the plurality of data entities, wherein the relationship intimacy value between the first and second data entities is a function of all the asserted and inferred relationships between the first and second data entities; and display one or more relationship intimacy values on a user interface.

15. The computer-readable medium of claim 14, wherein the asserted and inferred relationships are weighted, the asserted relationships having with a weighted value that is greater than the weighted value of the inferred relationship, and wherein the weighted values are included in the determination of the relationship intimacy value.

16. The computer-readable medium of claim 14, wherein determining the plurality of relationship intimacy value includes using a nearest neighbor technique.

17. The computer-readable medium of claim 14, wherein determining the plurality of relationship intimacy value includes using a fastest route technique.

18. The computer-readable medium of claim 14, wherein displaying the relationship intimacy values on the user interface comprises displaying a node-link diagram on the user interface.

19. The computer-readable medium of claim 14, wherein displaying the relationship intimacy values on the user interface comprises displaying the relationship intimacy values that exceed a specified threshold.

\* \* \* \* \*